United States Patent
Takemura et al.

(10) Patent No.: US 7,603,999 B2
(45) Date of Patent: Oct. 20, 2009

(54) METAL BONDED DRILLING AND BORING TOOL

(75) Inventors: Sokichi Takemura, Shizuoka (JP); Yoshikazu Kusachi, Shizuoka (JP); Akihiko Nakagawa, Shizuoka (JP)

(73) Assignee: Tenryu Seiko Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/023,160

(22) Filed: Dec. 28, 2004

(65) Prior Publication Data

US 2005/0155593 A1 Jul. 21, 2005

Related U.S. Application Data

(62) Division of application No. 10/013,663, filed on Dec. 13, 2001, now Pat. No. 6,851,418.

(30) Foreign Application Priority Data

Dec. 14, 2000 (JP) .............................. 2000-379694
Apr. 16, 2001 (JP) .............................. 2001-117325

(51) Int. Cl.
*B28D 5/04* (2006.01)
(52) U.S. Cl. .......................... 125/36; 408/144; 408/145; 451/540
(58) Field of Classification Search ................... 125/36; 408/144, 145; 451/540, 547
See application file for complete search history.

(56) References Cited

U.S. PATENT DOCUMENTS

| | | | | |
|---|---|---|---|---|
| 1,717,304 A | * | 6/1929 | Bayet ........................ | 451/541 |
| 1,915,016 A | | 6/1933 | Diffenderffer | |
| 2,359,594 A | * | 10/1944 | Turenchalk et al. .......... | 451/358 |
| 2,532,783 A | * | 12/1950 | Phipps ....................... | 175/391 |
| 2,633,682 A | * | 4/1953 | Jackson ..................... | 451/541 |
| 2,892,292 A | * | 6/1959 | Whitney ..................... | 451/507 |
| 3,127,715 A | | 4/1964 | Christensen | |
| 3,183,632 A | * | 5/1965 | Ferchland ................... | 451/541 |
| RE26,039 E | | 6/1966 | Johnson | |
| 3,343,615 A | | 9/1967 | Terry | |
| 3,495,359 A | | 2/1970 | Smith et al. | |
| 3,669,850 A | | 6/1972 | Draca | |
| 3,861,087 A | * | 1/1975 | Martin ....................... | 451/557 |
| 4,083,351 A | | 4/1978 | Greenspan | |
| 4,178,689 A | | 12/1979 | Nash | |
| 4,203,262 A | * | 5/1980 | Dunnington et al. ......... | 51/309 |
| 4,450,653 A | | 5/1984 | Fletcher | |

(Continued)

*Primary Examiner*—Maurina Rachuba
(74) *Attorney, Agent, or Firm*—Arent Fox LLP

(57) ABSTRACT

A metal bonded drilling and boring tool which can prevent the separation of abrasive grains during drilling and boring to maintain a stable working performance for a long period of time without the need for tool exchange. The tool includes a rod-shaped body having a substantially semispherical front end portion and numerous abrasive grains bonded to an outer circumferential surface of the rod-shaped body at the front end portion and at a portion having a given length from the front end portion by a bond member formed primarily of copper alloy. The bond member contains a material selected from the group consisting of Ti, Al, and a mixture thereof. The copper alloy is selected from the group consisting of bronze containing 10 to 33 wt % of Sn, brass containing 5 to 20 wt % of Zn, and aluminum bronze containing 5 to 20 wt % of Al.

15 Claims, 16 Drawing Sheets

U.S. PATENT DOCUMENTS

| | | | |
|---|---|---|---|
| 4,720,218 A * | 1/1988 | DeFries et al. | 408/145 |
| 4,798,024 A | 1/1989 | Grimm | |
| 4,834,655 A | 5/1989 | Kyotani | |
| 5,009,553 A * | 4/1991 | Nowman | 408/1 R |
| 5,137,098 A * | 8/1992 | Raffaelli | 175/403 |
| 5,354,155 A | 10/1994 | Adams | |
| 6,193,000 B1 | 2/2001 | Caraway et al. | |
| 6,277,016 B1 * | 8/2001 | Koide | 451/541 |
| 6,579,332 B1 * | 6/2003 | Takemura et al. | 51/309 |
| 6,620,522 B2 * | 9/2003 | Kusachi et al. | 428/551 |
| 2002/0035890 A1 * | 3/2002 | Kusachi et al. | 75/238 |

* cited by examiner

METAL BONDED DRILLING AND BORING TOOL

METAL BONDED DRILLING AND BORING TOOL

This is a Divisional Application of application Ser. No. 10/013,663 filed Dec. 13, 2001, now U.S. Pat. No. 6,851,418 which claims priority under 35 U.S.C. §119, to foreign applications No. 2000-379694 filed Dec. 14, 2000, and No. 2001-117325 filed Apr. 16, 2001, both filed in Japan. The disclosures of prior applications are hereby incorporated by reference.

BACKGROUND OF THE INVENTION

1. Field of the Invention

The present invention relates to a metal bonded drilling and boring tool.

2. Description of the Related Art

In the case of drilling a hole in a hard material such as a stone, concrete, and tile, it is conventionally general to mount a diamond core bit on an electric drill. Further, in the case of boring the drilled hole to enlarge its diameter, a so-called cemented carbide bar formed of cemented carbide alloy or high-speed steel is mounted on a trimmer, router, or hand grinder. In this mounted condition, the cemented carbide bar is rotated at a high speed of 10,000 rpm or more. As another conventional boring method, a shafted abrasive wheel or an electrodeposited bar formed by electrodeposition of diamond abrasive grains on a steel bar is mounted on a trimmer, router, or hand grinder. In this mounted condition, the shafted abrasive wheel or the diamond electrodeposited bar is rotated at a high speed.

Thus, the boring is performed by using another tool such as a cemented carbide bar after drilling a hole by using a diamond core bit. Accordingly, the drilling tool must be exchanged to the boring tool before boring, causing a reduction in workability. Although a ceramics board containing a cement material may be bored by using a cemented carbide bar, the life of the cemented carbide bar is very short in this case. Further, although a stone or tile may be bored by using a shafted abrasive wheel or diamond electrodeposited bar, such a tool has a characteristic of undergoing a large cutting resistance, causing a reduction in life. Further, such a large cutting resistance causes exertion of a large force on the shaft of such a tool. As a result, the tool may be broken before deterioration in cutting performance.

SUMMARY OF THE INVENTION

It is therefore an object of the present invention to provide a metal bonded drilling and boring tool which can perform drilling and boring to a hard material such as a stone, concrete, and tile without the need for tool exchange.

In accordance with an aspect of the present invention, there is provided a metal bonded drilling and boring tool including a rod-shaped body having a substantially semispherical front end portion; and numerous abrasive grains bonded to an outer circumferential surface of the rod-shaped body at the front end portion and at a portion having a given length from the front end portion by a bond member formed primarily of copper alloy; the bond member containing a material selected from the group consisting of Ti, Al, and a mixture thereof; an average abrasive grain projection height being set to 30% or more of an average abrasive grain diameter, where the abrasive grain projection height is defined as the distance between the surface of a deepest portion of the bond member present between any two adjacent ones of the abrasive grains and the top of each of the two adjacent abrasive grains; an average abrasive grain spacing being set to 200% or more of the average abrasive grain diameter, where the abrasive grain spacing is defined as the distance between the tops of the two adjacent abrasive grains.

Preferably, the rod-shaped body has at least one escape portion formed on the portion having the given length. The escape portion functions to facilitate the ejection of chips. Preferably, the copper alloy is selected from the group consisting of bronze containing 10 to 33 wt % of Sn, brass containing 5 to 20 wt % of Zn, and aluminum bronze containing 5 to 20 wt % of Al. Preferably, the abrasive grains are selected from the group consisting of diamond, cubic boron nitride, silicon carbide, and cemented carbide powder.

In accordance with another aspect of the present invention, there is provided a metal bonded drilling and boring tool including a rod-shaped body having a substantially semispherical front end portion and a depression formed on the front end portion at the center and in the vicinity thereof; and numerous abrasive grains brazed to an outer circumferential surface of the rod-shaped body at the front end portion and at a portion having a given length from the front end portion by a brazing member.

Preferably, the brazing member comprises a bond member formed primarily of copper alloy; the bond member containing a material selected from the group consisting of Ti, Al, and a mixture thereof; an average abrasive grain projection height being set to 30% or more of an average abrasive grain diameter, where the abrasive grain projection height is defined as a distance between the surface of a deepest portion of the bond member present between any two adjacent ones of the abrasive grains and the top of each of the two adjacent abrasive grains; an average abrasive grain spacing being set to 200% or more of the average abrasive grain diameter, where the abrasive grain spacing is defined as a distance between the tops of the two adjacent abrasive grains. Preferably, the rod-shaped body has at least one escape portion formed on the portion having the given length. More preferably, the rod-shaped body has at least one groove formed on the front end portion.

In accordance with a further aspect of the present invention, there is provided a metal bonded drilling and boring tool including a thick-walled pipe-shaped body having an annular front end portion having a substantially semicircular cross section; and numerous abrasive grains brazed to an outer circumferential surface of the pipe-shaped body at the front end portion and at a portion having a given length from the front end portion by a brazing member.

Preferably, the brazing member comprises a bond member formed primarily of copper alloy; the bond member containing a material selected from the group consisting of Ti, Al, and a mixture thereof; an average abrasive grain projection height being set to 30% or more of an average abrasive grain diameter, where the abrasive grain projection height is defined as a distance between the surface of a deepest portion of the bond member present between any two adjacent ones of the abrasive grains and the top of each of the two adjacent abrasive grains; an average abrasive grain spacing being set to 200% or more of the average abrasive grain diameter, where the abrasive grain spacing is defined as a distance between the tops of the two adjacent abrasive grains. Preferably, the pipe-shaped body has at least one escape portion formed on the portion having the given length. More preferably, the pipe-shaped body has at least one groove formed on the front end portion.

In accordance with a still further aspect of the present invention, there is provided a metal bonded drilling and boring tool including a rod-shaped body having a substantially semispherical front end portion and a first diameter; an enlarged mounting portion having a second diameter larger than the first diameter, the enlarged mounting portion having a mounting hole with an internal screw thread; a connecting portion connecting the rod-shaped body and the enlarged mounting portion; and numerous abrasive grains brazed to an outer circumferential surface of the rod-shaped body at the front end portion and at a portion having a given length from the front end portion by a brazing member.

Preferably, the connecting portion has a concave surface continuing to the outer circumferential surface of the rod-shaped body or has a frustoconical shape. Thus, the rod-shaped body and the enlarged mounting portion are connected by the connecting portion having a concave surface or a frustoconical shape, so that stress concentration occurring at the joint between the rod-shaped body and the connecting portion during boring can be suppressed. As a result, the life of the tool can be extended.

In accordance with a still further aspect of the present invention, there is provided a metal bonded drilling and boring tool including a rod-shaped body having a substantially semispherical front end portion and a first diameter; an enlarged mounting portion having a second diameter larger than the first diameter; a connecting portion connecting the rod-shaped body and the enlarged mounting portion; and numerous abrasive grains brazed to an outer circumferential surface of the rod-shaped body at the front end portion and at a portion having a given length from the front end portion by a brazing member.

Preferably, the connecting portion has a concave surface or a frustoconical shape. With this structure, stress concentration at the joint between the rod-shaped body and the connecting portion during boring can be suppressed to thereby extend the life of the tool.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
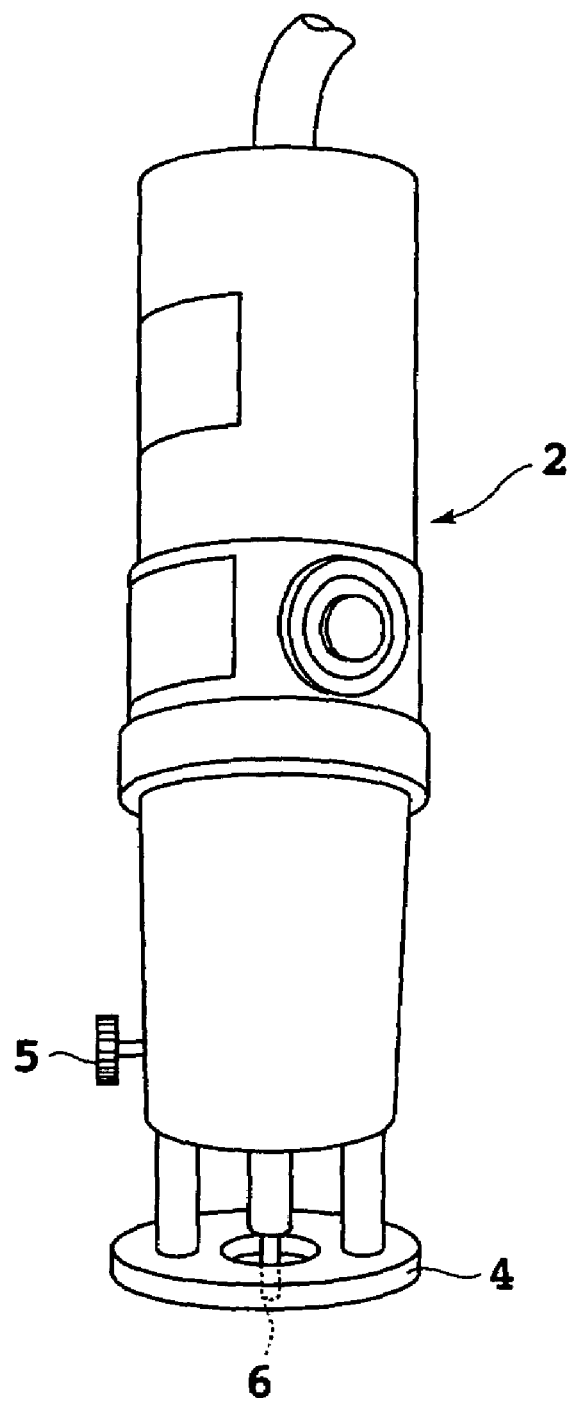
FIG. 1 is a perspective view of a hand grinder in the condition where a metal bonded drilling and boring tool according to a first preferred embodiment of the present invention is mounted.

Some preferred embodiments of the present invention will now be described with reference to the drawings. In the following description of the preferred embodiments, substantially the same parts are denoted by the same reference numerals. Referring to FIG. 1, there is shown a perspective view of a hand grinder 2 to which the metal bonded drilling and boring tool of the present invention is mountable. A metal bonded drilling and boring tool 6 according to a first preferred embodiment of the present invention is detachably mounted on the hand grinder 2 at its front end (lower end). An annular member 4 for restricting the depth of cut by the tool 6 is adjustably mounted at the front end of the hand grinder 2. The annular member 4 can be adjusted in position by loosening a screw 5 to move the annular member 4 relative to the body of the hand grinder 2 and next tightening the screw 5 again.

Figure 2:
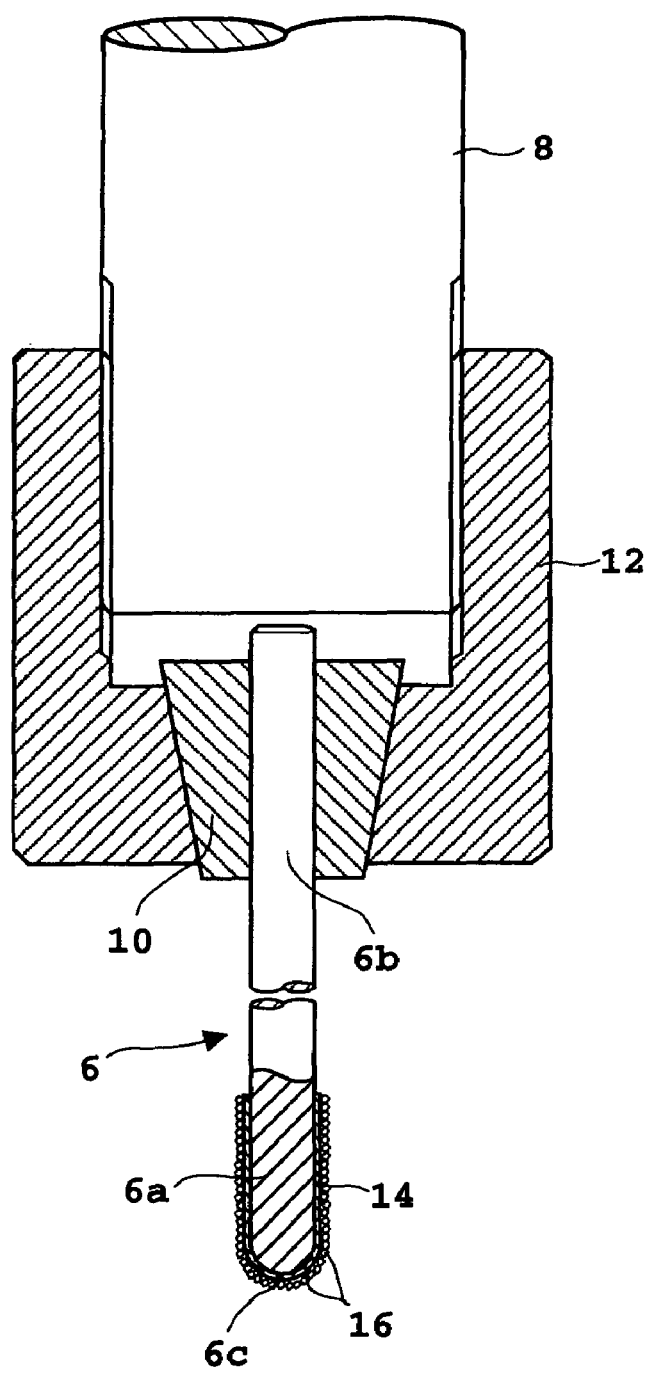
FIG. 2 is a vertical sectional view of a tool mounting portion of the hand grinder on which the tool according to the first preferred embodiment is mounted.

FIG. 2 is a vertical sectional view of a tool mounting portion of the hand grinder 2. The hand grinder 2 has a spindle 8 having a threaded end portion, a collet chuck 10 for chucking the tool 6, and a nut 12 engaged with the threaded end portion of the spindle 8 for holding the collet chuck 10. The tool 6 has a rod-shaped body 6a and a shank portion 6b. The shank portion 6b of the tool 6 is inserted into the collet chuck 10, and the nut 12 is tightened to the threaded end portion of the spindle 8 of the hand grinder 2, thus mounting the tool 6 at the front end of the spindle 8.

Figure 3A:
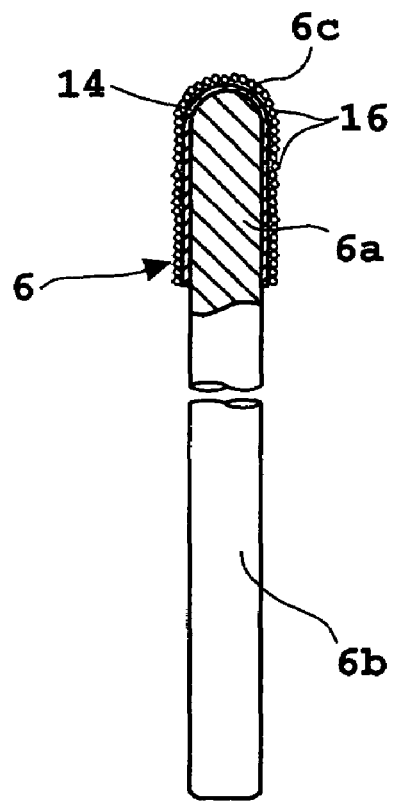
FIG. 3A is a partially sectional, elevational view of the tool according to the first preferred embodiment.
Figure 3B:
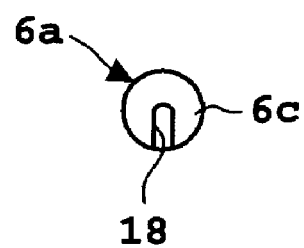
FIG. 3B is a top plan view of a rod-shaped body of the tool shown in FIG. 3A.

Referring to FIG. 3A, there is shown a partially sectional, elevational view of the tool 6. FIG. 3B is a top plan view of the rod-shaped body 6a of the tool 6. A part of the rod-shaped body 6a is formed as the shank portion 6b. The rod-shaped body 6a is formed of steel containing not less than 0.3 wt % of C and not less than 0.5 wt % of Mn, Cr, or Ni. The tool 6 further has metal bonded abrasive grains 16 fixed through a metal bond member 14 to the outer surface of the rod-shaped body 6a. In a manufacturing process for the tool 6, the abrasive grains 16 are bonded to the rod-shaped body 6a at a high temperature in a vacuum furnace, and the tool 6 is thereafter rapidly cooled by introducing a hydrogen gas or nitrogen gas into the vacuum furnace, thereby obtaining a Rockwell hardness $H_{RC}$ of 20 to 40. Accordingly, the rod-shaped body 6a has a sufficient hardness and toughness, so that it is hard to break.

The rod-shaped body 6a has a diameter of 6 mm, for example, and has a semispherical front end portion 6c. As best shown in FIG. 3B, the semispherical front end portion 6c is formed with a groove 18 for chip ejection. The metal bonded abrasive grains 16 are numerous diamond abrasive grains bonded by the metal bond member 14 to the outer circumferential surface of the rod-shaped body 6a at the semispherical front end portion 6c and at a portion having a given length (e.g., about 40 mm) from the front end portion 6c.

Figure 4A:
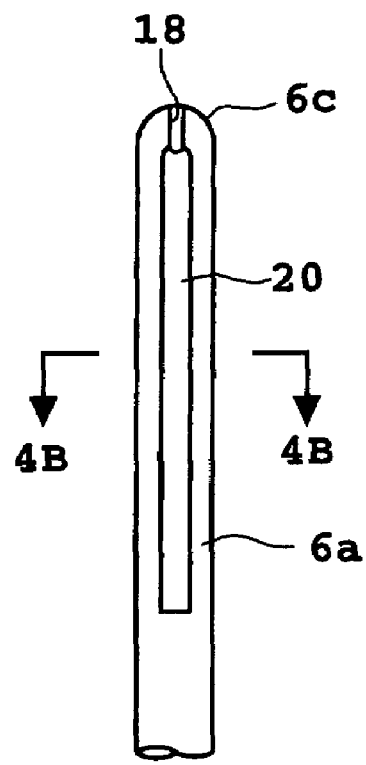
FIG. 4A is an elevational view of the rod-shaped body.
Figure 4B:
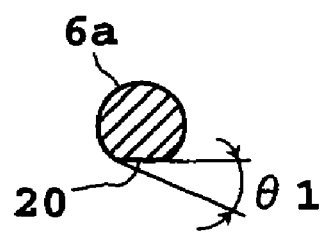
FIG. 4B is a cross section taken along the line 4B-4B in FIG. 4A.

Referring to FIG. 4A, there is shown an elevational view of the rod-shaped body 6a. FIG. 4B is a cross section taken along the line 4B-4B in FIG. 4A. As shown in FIGS. 4A and 4B, the outer circumferential surface of the rod-shaped body 6a has at least one escape portion 20 for allowing easy ejection of chips during drilling. In this preferred embodiment, the escape portion 20 is formed as a flat portion extending in the axial direction of the rod-shaped body 6a in conjunction with the groove 18. Referring to FIG. 4B, θ1 is an angle defined between the flat escape portion 20 and the tangent to a circle on the cross section of the rod-shaped body 6a. The angle θ1 is set to preferably about 60 degrees or less, more preferably in the range of about 10 degrees to about 45 degrees.

A manufacturing method for the metal bonded drilling and boring tool 6 according to the first preferred embodiment will now be described. 66 wt % of bronze powder containing 23 wt % of Sn, 11 wt % of Ti compound powder, and 20 wt % of stearic acid as an organic viscous material are kneaded together with well stirring by using a kneader to obtain a paste mixture.

This paste mixture is applied to the outer circumferential surface of the rod-shaped body 6a at the semispherical front end portion 6c and the portion having the given length therefrom by using a spatula or the like. To set the thickness of the metal bond member 14, an excess amount of the paste mixture applied to the outer circumferential surface of the rod-shaped body 6a is preferably removed by using a thickness gauge jig to obtain a predetermined uniform thickness of the coating of the paste mixture. Thereafter, a required amount of diamond abrasive grains is scattered on the coating of the paste mixture and attached thereto. Thereafter, the metal bonded drilling and boring tool 6 is put into a vacuum furnace, and the vacuum furnace is evacuated to a vacuum of 3.9 Pa. Under this vacuum, the tool 30 is maintained at 950° C. for 20 minutes in the vacuum furnace. Thereafter, a nitrogen gas is introduced into the vacuum furnace to rapidly cool the tool 6 down to room temperature. Finally, the tool 6 is removed from the vacuum furnace.

By maintaining the tool 6 at 950° C. for 20 minutes in the vacuum furnace, the paste mixture is molten. Further, by cooling the molten paste mixture to room temperature, it is solidified to be bonded to the rod-shaped body 6a, thus forming the metal bond member 14. Further, by rapid cooling from 950° C. with the nitrogen gas, the rod-shaped body 6a containing C, Mn, Cr, or Ni can obtain a hardness $H_{RC}$ of 20 to 40. Ti has a property of wetting the diamond abrasive grains 16 by its reducing power, and well soluble in bronze. Accordingly, the diamond abrasive grains 16 are chemically strongly fixed to the metal bond member 14, so that the separation of the diamond abrasive grains 16 from the metal bond member 14 can be prevented.

Figure 5:
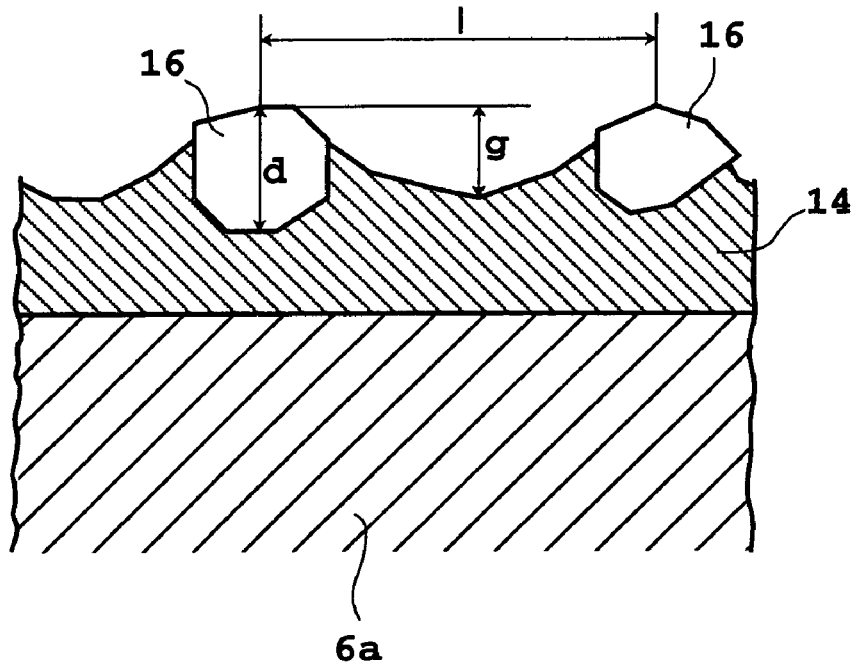
FIG. 5 is an enlarged sectional view of an essential part of the tool, showing the relation between abrasive grains and a metal bond member.

Referring to FIG. 5 which is an enlarged sectional view of an essential part of the tool 6, the distance between the surface of a deepest portion of the metal bond member 14 present between any two adjacent ones of the abrasive grains 16 and the top of each diamond abrasive grain 16 is defined as an abrasive grain projection height. In this case, an average abrasive grain projection height g is preferably set to 30% or more of an average abrasive grain diameter d. Further, when the distance between the tops of the two adjacent diamond abrasive grains 16 is defined as an abrasive grain spacing, an average abrasive grain spacing 1 is preferably set to 200% or more of the average abrasive grain diameter d. Thus, the average abrasive grain projection height g of the diamond abrasive grains 16 is set larger than that of a conventional grinding tool, and the average abrasive grain spacing 1 is also set larger. With this configuration, an improved grinding performance or drilling performance can be exhibited.

The average abrasive grain projection height g may be adjusted by controlling the thickness of the coating of the paste mixture. In general, the thickness of the coating of the paste mixture is preferably set to 70 to 120% of the average abrasive grain diameter d. The average abrasive grain projection height g was obtained by the following method. Three arbitrary positions on the rod-shaped body 6a of the tool 6 on which the diamond abrasive grains 16 had been bonded were selected, and the abrasive grain projection heights of ten grains 16 at each position were measured. Thus, totally 30 grains 16 were used for the measurement. Then, an arithmetic mean of the abrasive grain projection heights of the 30 grains 16 was calculated to obtain the average abrasive grain projection height g. The measurement of the abrasive grain projection heights was made by using a microscope. The grain size of the diamond abrasive grains 16 is preferably set to 30 to 400 mesh. The material of the abrasive grains usable in the present invention is not limited to diamond, but CBN (cubic boron nitride), SiC (silicon carbide), or cemented carbide powder may also be adopted.

The copper alloy usable in the present invention includes bronze containing 10 to 33 wt % of Sn, brass containing 5 to 20 wt % of Zn, and aluminum bronze containing 5 to 20 wt % of Al. Particularly in the case of aluminum bronze, the abrasive grains can be bonded to the metal bond member without the addition of Ti compound powder by increasing the vacuum in heating. Further, even when the vacuum in heating is low, the abrasive grains can be bonded to the metal bond member with the addition of a small amount of Ti compound powder. The Ti compound powder used in this preferred embodiment contains 50 atom % of Al (about 36 wt % of Al). The content of Ti in the metal bond member is preferably set to about 10 to 15 wt %. The particle size of the Ti compound powder is preferably set to about 240 to 350 mesh.

The Ti compound powder may be replaced by Ti powder, Al powder, or Al compound powder. Ti or Al has a property of wetting ceramic abrasive grains by its reducing power, and well soluble in the copper alloy. Further, Ti or Al functions to enhance the strength of the copper alloy, so that it is a suitable additive for the metal bond member. Examples of the organic viscous material include stearic acid, paraffin, and polyethylene glycol, which may be used solely or in combination.

Figure 6:
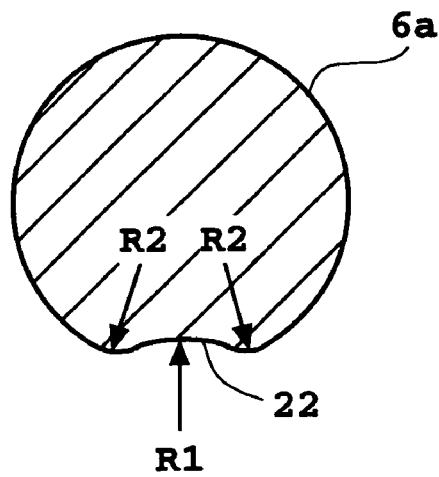
FIG. 6 is a cross section of a rod-shaped body having an arcuate escape portion as a modification of the first preferred embodiment.

As shown in FIG. 6, the rod-shaped body 6a may have an arcuate escape portion 22 in place of the flat escape portion 20 shown in FIGS. 4A and 4B. The arcuate escape portion 22 is concavely formed on the outer circumferential surface of the rod-shaped body 6a, and has a radius of curvature R1. In this case, the interface between the arcuate escape portion 22 and the outer circumferential surface of the rod-shaped body 6a has a radius of curvature R2. The radius of curvature R2 is preferably set to 1 mm or more, so as to prevent separation of the diamond abrasive grains 16 from the rod-shaped body 6a. In the case that the interface is not rounded, the angle corresponding to $\theta 1$ shown in FIG. 4B is set to preferably 60 degrees or less, more preferably 10 to 45 degrees.

Figure 7:
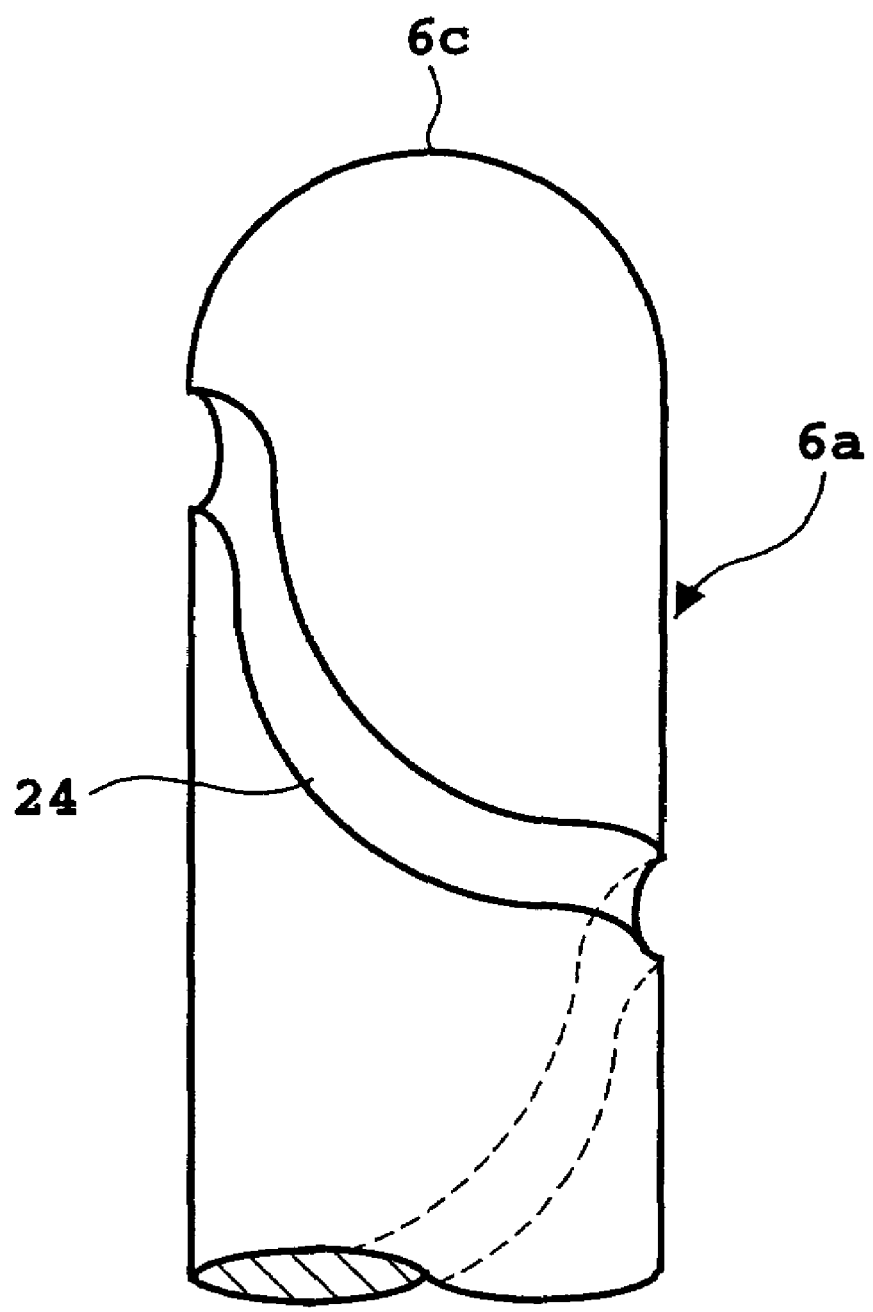
FIG. 7 is an elevational view of a rod-shaped body having a spiral escape portion as another modification of the first preferred embodiment.

As shown in FIG. 7, the rod-shaped body 6a may have a spiral escape portion 24 in place of the flat escape portion 20 shown in FIGS. 4A and 4B. By forming the spiral escape portion 24 on the outer circumferential surface of the rod-shaped body 6a, the ejection of chips can be further improved.

In the case of performing drilling and boring to a hard material such as a stone or concrete, the metal bonded drilling and boring tool 6 is mounted on a rotary tool such as the hard grinder 2 shown in FIG. 1 by using the collet chuck 10 shown in FIG. 2. Since the diamond abrasive grains 16 are strongly bonded to the body 6a by the metal bond member 14, the tool 6 can be rotated at a high speed of 10,000 rpm or more, preferably 25,000 to 35,000 rpm, thereby easily drilling a hole in a hard material such as a stone or concrete. Further, the drilled hole can be easily bored to be enlarged in diameter as required by using the same tool 6. While a large bending stress is exerted on the shank portion 6b during boring, a high durability against the stress can be ensured because the rod-shaped body 6a is formed of steel having a sufficient hardness and toughness.

Figure 8A:
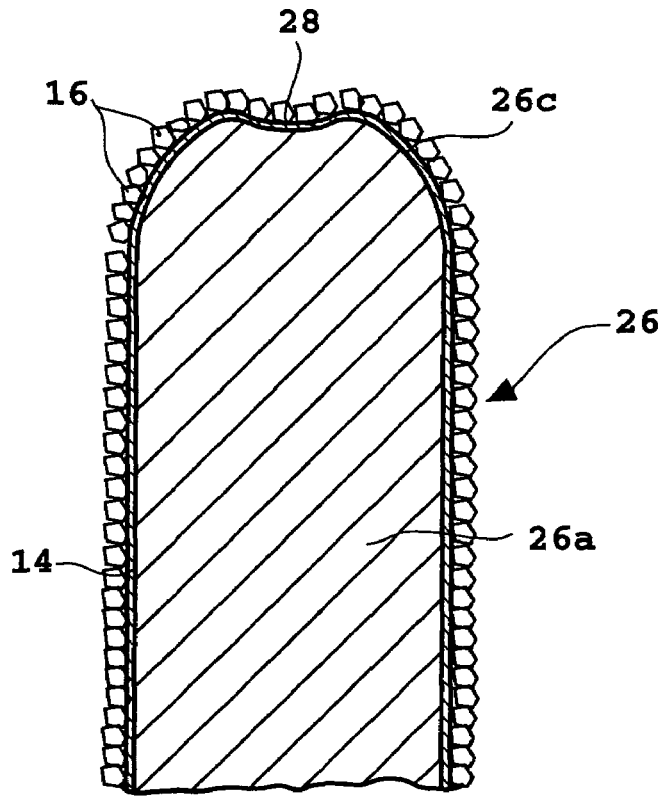
FIG. 8A is a vertical sectional view of a front portion of a metal bonded drilling and boring tool according to a second preferred embodiment of the present invention.

Referring to FIG. 8A, there is shown a vertical sectional view of a front portion of a metal bonded drilling and boring tool 26 according to a second preferred embodiment of the present invention. The tool 26 has a rod-shaped body 26a formed of steel having a composition and hardness similar to those of the rod-shaped body 6a of the tool 6 according to the first preferred embodiment. The rod-shaped body 26a has a semispherical front end portion 26c as in the first preferred embodiment. The semispherical front end portion 26c is formed with a sectionally arcuate depression (dimple) 28 at the center and in the vicinity thereof. A test was conducted on the tool 6 according to the first preferred embodiment, and it was found from the test result that a part of the diamond abrasive grains 16 bonded at and near the center of the semispherical front end portion 6c are prone to separate off. Further, the separation of a part of the diamond abrasive grains 16 causes easy spread of separation of the diamond abrasive grains 16 over the entire bonded surface of the body 6a.

The cause of this separation of the diamond abrasive grains 16 bonded at and near the center of the front end portion 6c was examined to consider that the peripheral speed of the tool 6 near the axis thereof is very low even when the tool 6 mounted on the hand grinder is rotated at a high speed, so that the diamond abrasive grains 16 bonded near the center of the front end portion 6c are easily separated. From this point of view, the sectionally arcuate depression 28 is formed at and near the center of the front end portion 26c of the tool 26 according to the second preferred embodiment, so that the tool 26 does not come into direct contact with a work at the depression 28. That is, the depression 28 functions as an escape portion, thus preventing the separation of the diamond abrasive grains 16 at the depression 28.

Like the first preferred embodiment, the diamond abrasive grains 16 are bonded by the metal bond member 14 to the outer circumferential surface of the rod-shaped body 26a at the semispherical front end portion 26c and at a portion having a length of about 40 mm from the front end portion 26c. Further, the flat escape portion 20 as shown in FIG. 4A is formed on the outer circumferential surface of the rod-shaped body 26a, so as to easily eject chips during drilling.

Figure 8B:
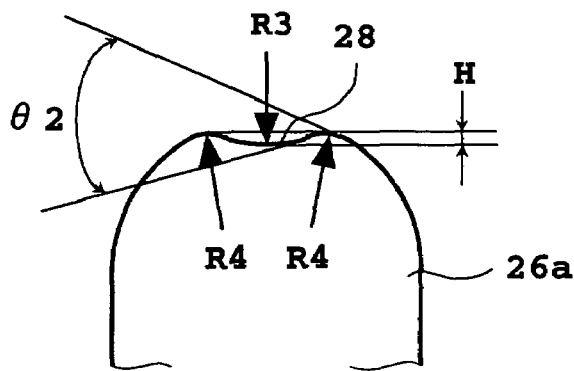
FIG. 8B is a schematic view for illustrating preferable dimensions of a depression formed on a semispherical front end portion of a rod-shaped body of the tool shown in FIG. 8A.

Referring to FIG. 8B, preferable dimensions of the sectionally arcuate depression 28 formed on the semispherical front end portion 26c are illustrated. $\theta 2$ is an angle defined between the tangent to the depression 28 and the tangent to the interface between the depression 28 and a part of the semispherical front end portion 26c as surrounding the depression 28. The angle $\theta 2$ is set to preferably 45 degrees or less, and the depth H of the depression 28 is set to preferably 0.3 mm or more. Further, the above interface between the depression 28 and the surrounding part of the front end portion 26c has a radius of curvature R4. The radius of curvature R4 is set to preferably 1 mm or more, so as to prevent separation of the diamond abrasive grains 16 at this interface. If this interface is not rounded, but has a sharp edge, the diamond abrasive grains 16 are easily separated from this interface.

Figure 9A:
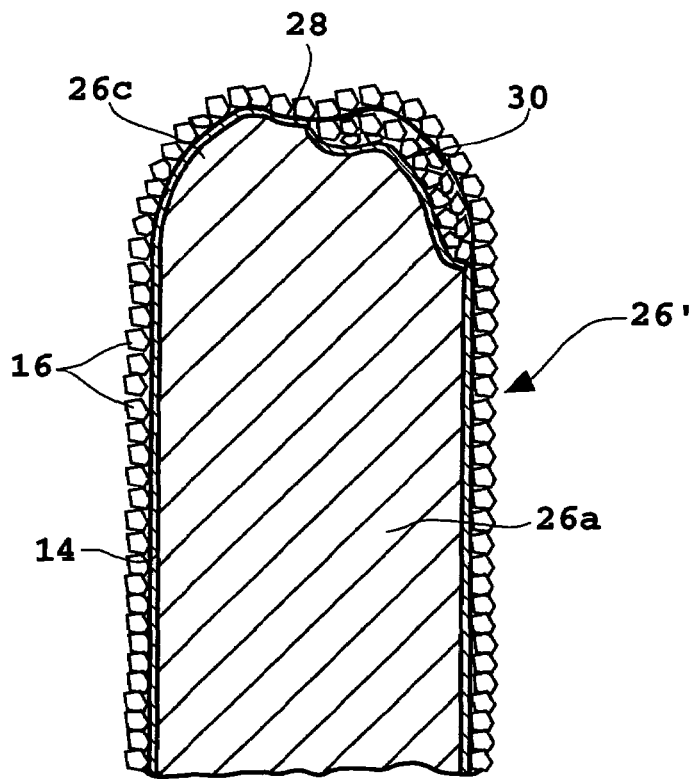
FIG. 9A is a vertical sectional view of a front portion of a metal bonded drilling and boring tool according to a third preferred embodiment of the present invention.
Figure 9B:
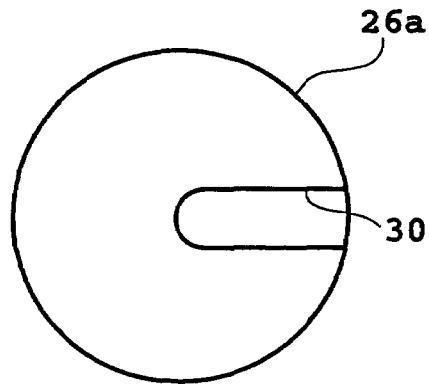
FIG. 9B is a top plan view of a rod-shaped body of the tool shown in FIG. 9A.

Referring to FIG. 9A, there is shown a vertical sectional view of a front portion of a metal bonded drilling and boring tool 26' according to a third preferred embodiment of the present invention. FIG. 9B is a top plan view of a rod-shaped body 26a of the tool 26'. The rod-shaped body 26a of the tool 26' according to this preferred embodiment is similar to that according to the second preferred embodiment shown in FIG. 8A except that the semispherical front end portion 26c is formed with a groove 30 for ejecting chips during drilling.

Figure 10A:
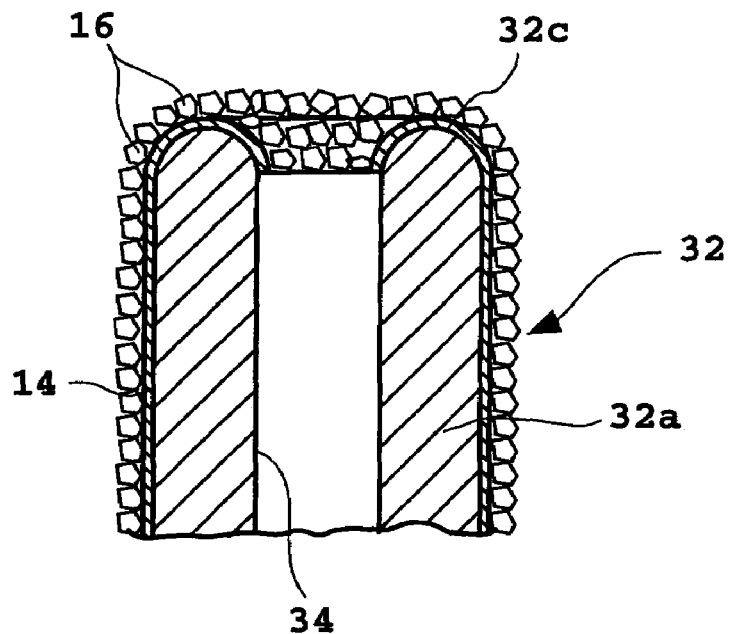
FIG. 10A is a vertical sectional view of a front portion of a metal bonded drilling and boring tool according to a fourth preferred embodiment of the present invention.
Figure 10B:
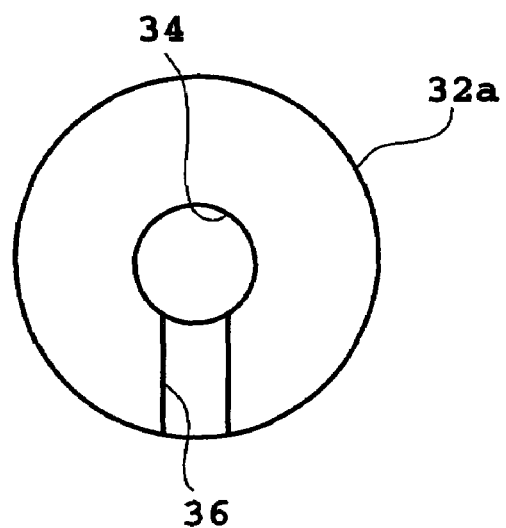
FIG. 10B is a top plan view of a pipe-shaped body of the tool shown in FIG. 10A.

Referring to FIG. 10A, there is shown a vertical sectional view of a front portion of a metal bonded drilling and boring tool 32 according to a fourth preferred embodiment of the present invention. The tool 32 has a thick-walled pipe-shaped body 32a having a central hole 34 and an annular front end portion 32c. The front end portion 32c has a substantially semicircular cross section. Numerous diamond abrasive grains 16 are bonded by a metal bond member 14 to the outer circumferential surface of the pipe-shaped body 32a at the front end portion 32c and at a portion having a given length (e.g., 40 mm) from the front end portion 32c. As shown in FIG. 10B which is a top plan view of the pipe-shaped body 32a, the front end portion 32c is formed with a groove 36 for ejecting chips during drilling. However, the groove 36 is not essential.

Figure 11A:
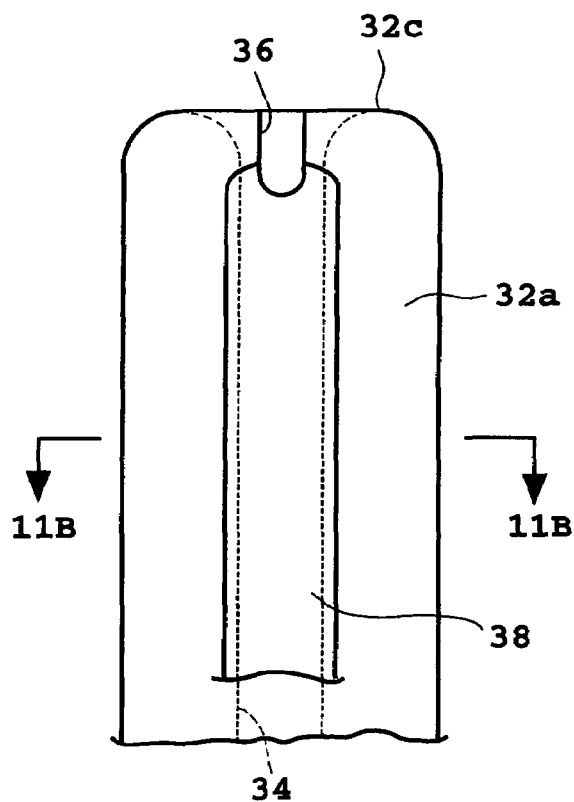
FIG. 11A is an elevational view of the pipe-shaped body shown in FIG. 10A.
Figure 11B:
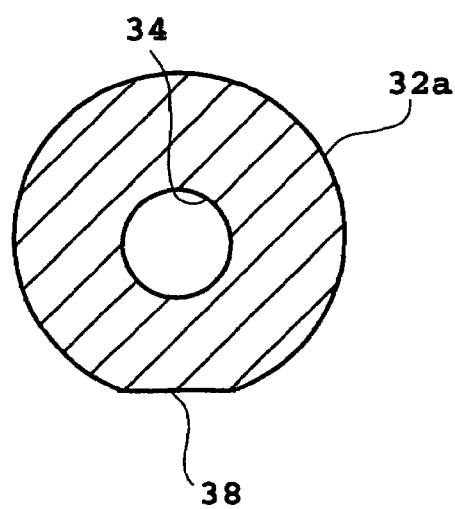
FIG. 11B is a cross section taken along the line 11B-11B in FIG. 11A.

FIG. 11A is an elevational view of the pipe-shaped body 32a, and FIG. 11B is a cross section taken along the line 11B-11B in FIG. 11A. As apparent from FIGS. 11A and 11B, a flat escape portion 38 for allowing easy ejection of chips during drilling is formed on the outer circumferential surface of the pipe-shaped body 32a so as to extend in the axial direction of the body 32a in conjunction with the groove 36. By adopting the pipe-shaped body 32a having the central hole 34, the tool 32 excludes a central portion whose peripheral speed is zero or very low during high-speed rotation of the tool 32. Accordingly, the separation of the diamond abrasive grains 16 from such a central portion where they are easily separated during drilling can be effectively prevented. The pipe-shaped body 32a is formed of a hard and tough material similar to that of the rod-shaped body 6a or 26a, so that it is possible to ensure a high durability against a bending stress exerted on a shank portion (not shown) of the body 32a.

Each of the tools 6, 26, 26', and 32 according to the first to fourth preferred embodiments mentioned above has a straight shape with a substantially uniform diameter from the front portion to the shank portion. As shown in FIG. 2, the tool is mounted at the front end of the spindle 8 of the hand grinder 2 by inserting the shank portion into the collet chuck 10 and tighten the nut 12 to the threaded end portion of the spindle 8. In boring a drilled hole by using each of the tools 6, 26, 26', and 32 having such a straight shape, it was found from a test that very large stress concentration occurs at a position of the shank portion corresponding to the front end of the collet chuck 10 and that the tool is prone to break at this position. From this point of view, the following preferred embodiments are intended to suppress the stress concentration occurring at the shank portion.

Figure 12:
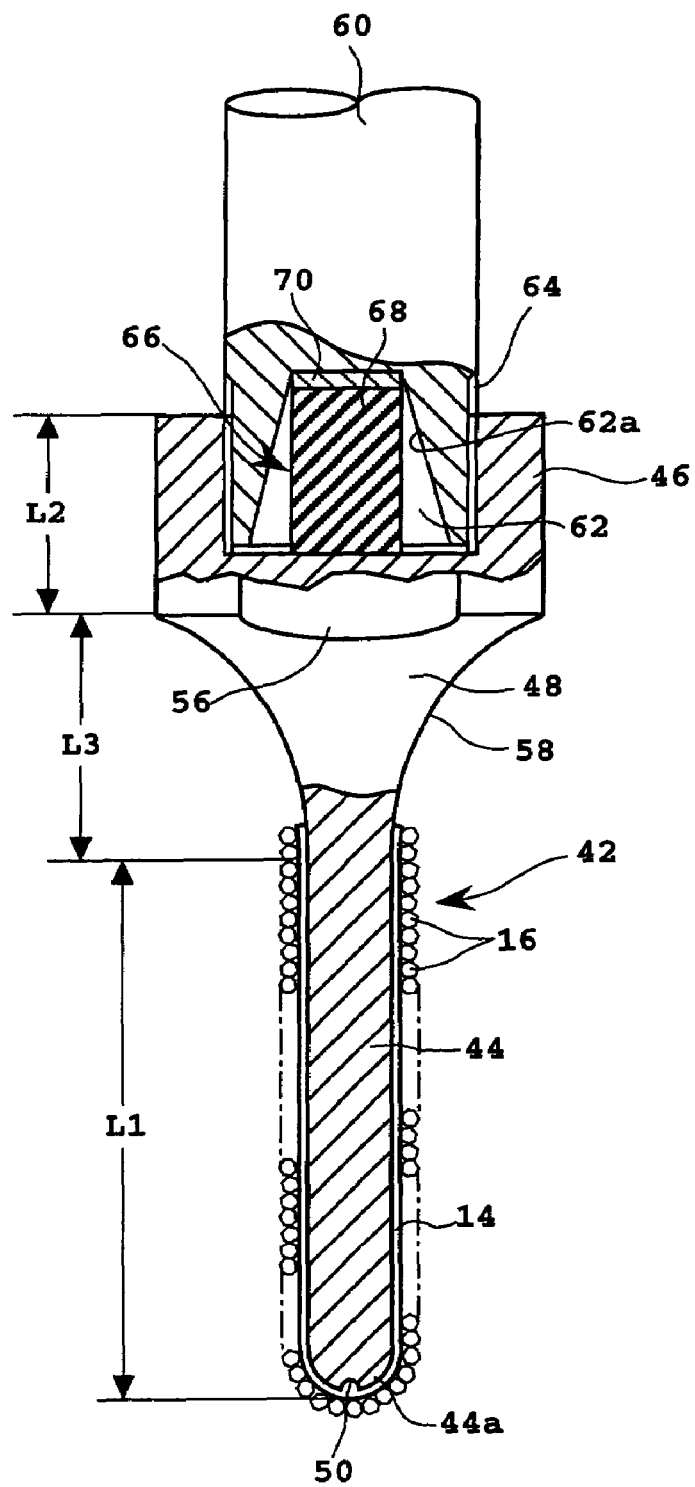
FIG. 12 is a partially sectional, elevational view of a metal bonded drilling and boring tool according to a fifth preferred embodiment of the present invention in the condition where the tool is mounted on a spindle.
Figure 13:
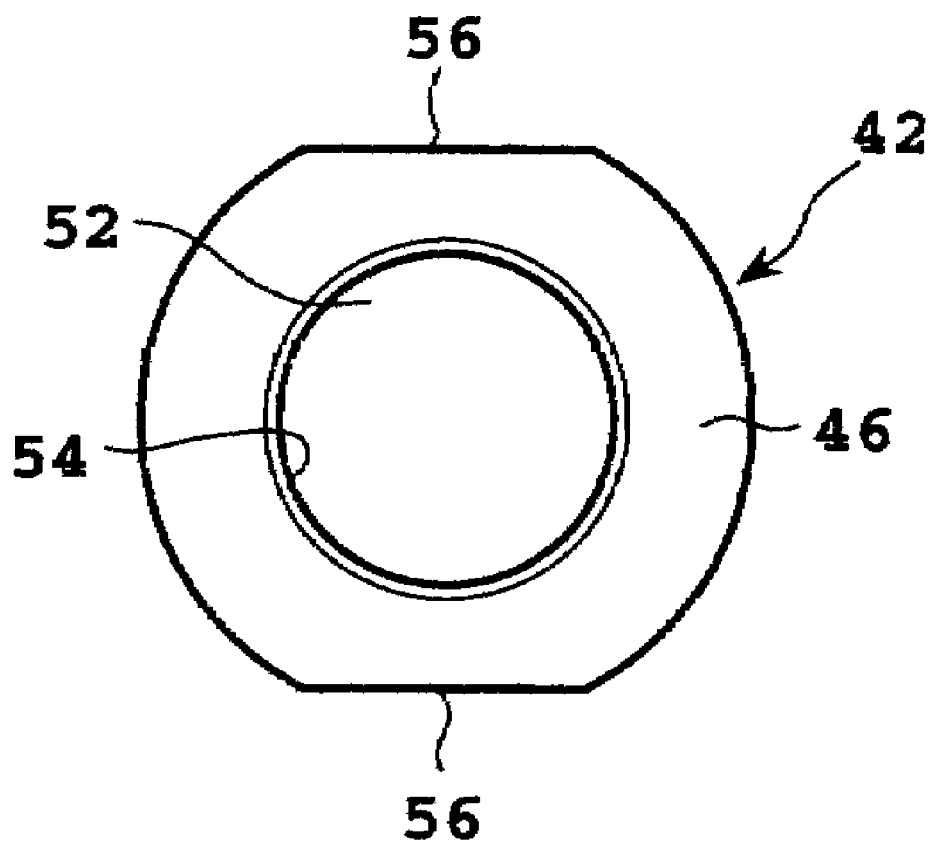
FIG. 13 is a top plan view of the tool shown in FIG. 12.

Referring to FIG. 12, there is shown a vertical sectional view of a metal bonded drilling and boring tool 42 according to a fifth preferred embodiment of the present invention in the condition where the tool 42 is mounted on a tool mounting portion of a hand grinder different in type from the hand grinder shown in FIG. 2. FIG. 13 is a top plan view of the tool 42. The tool 42 includes a rod-shaped body 44 having a first diameter, an enlarged mounting portion 46 having a second diameter larger than the first diameter, and a connecting portion 48 connecting the rod-shaped body 44 and the enlarged mounting portion 46.

The rod-shaped body 44, the enlarged mounting portion 46, and the connecting portion 48 are integrally formed of steel containing not less than 0.3 wt % of C and not less than 0.5 wt % of Mn, Co, or Ni. The tool 42 further includes metal bonded abrasive grains 16 fixed through a metal bond member 14 to the outer surface of the rod-shaped body 44. In manufacturing process for the tool 42, the abrasive grains 16 are bonded to the rod-shaped body 44 at a high temperature in a vacuum furnace, and the tool 42 is thereafter rapidly cooled by introducing a hydrogen gas or nitrogen gas into the vacuum furnace, thereby obtaining a Rockwell hardness $H_{RC}$ of 20 to 40. Accordingly, the rod-shaped body 44 has a sufficient hardness and toughness, so that it is hard to break.

The rod-shaped body 44 has a diameter of 4 mm, for example, and has a semispherical front end portion 44a. The semispherical front end portion 44a is formed with a depression (dimple) 50 at the center and in the vicinity thereof. The rod-shaped body 44 has a length L1 of 30 mm, for example. The metal bonded abrasive grains 16 are numerous diamond abrasive grains bonded by the metal bond member 14 to the outer circumferential surface of the rod-shaped body 44 over the length L1 and of a part of the connecting portion 48 continuing to the rod-shaped body 44.

Although not especially shown, the semispherical front end portion 44a of the rod-shaped body 44 is formed with a groove for chip ejection as similar to the groove 18 shown in FIG. 4A. Further, at least one escape portion like the escape portion 20 shown in FIG. 4A is formed on the outer circumferential surface of the rod-shaped body 44. As shown in FIG. 13, the enlarged mounting portion 46 has a mounting hole 52 with an internal screw thread 54, and has a pair of opposed flat portions 56 for engaging a wrench.

The enlarged mounting portion 46 has an outer diameter of 20 mm, for example, and the mounting hole 52 has a diameter of 14 mm or ½ inch, for example. The enlarged mounting portion 46 has a length L2 of 12 mm, for example. The connecting portion 48 has a concave surface 58 continuing to the outer circumferential surface of the rod-shaped body 44. The concave surface 58 is defined by rotating an arc continuing to the outer circumferential surface of the rod-shaped body 44 and connected to the outer circumferential surface of the enlarged mounting portion 46, about the axis of the rod-shaped body 44.

The concave surface 58 has a radius of curvature of 1 mm or more, preferably 10 mm or more, more preferably 20 to 40 mm. The connecting portion 48 has a length L3 of about 10 mm, for example. Reference numeral 60 denotes a spindle of a hand grinder or the like. The spindle 60 is formed at its front end with a recess 62 having a conical surface 62a. Further, an external screw thread 64 is formed on the outer circumferential surface of the spindle 60 at its front end portion for engagement with the internal screw thread 54 of the enlarged mounting portion 46 of the tool 42. An elastic unit 66 is bonded to the bottom surface of the mounting hole 52 of the enlarged mounting portion 46 of the tool 42. The elastic unit 66 is composed of a rubber member 68 and an iron plate 70 bonded to the rubber member 68. The rubber member 68 may be replaced by a soft resin member.

The tool 42 is mounted to the spindle 60 by engaging the internal screw thread 54 of the mounting hole 52 of the enlarged mounting portion 46 with the external screw thread 64 of the spindle 60 and next engaging a wrench (not shown) with the flat portions 56 to tighten the enlarged mounting portion 46 to the spindle 60. At this time, the rubber member 68 of the elastic unit 66 interposed between the tool 42 and the spindle 60 is compressed to thereby prevent loosening of the tool 42 tightened to the spindle 60. If the elastic unit 66 is not provided, there is a possibility that the tool 42 may be loosened and dropped from the spindle 60 during high-speed rotation of the tool 42.

The elastic unit 66 is not necessarily bonded to the bottom surface of the mounting hole 52. That is, a similar effect of prevention of loosening of the tool 42 may also be obtained by inserting the elastic unit 66 into the recess 62 of the spindle 60 and next tightening the tool 42 to the spindle 60. The elastic unit 66 may be replaced by any elastic member such as a coil spring or spring washer interposed between the tool 42 and the spindle 60.

According to this preferred embodiment, the rod-shaped body 44 is integrally connected through the connecting portion 48 having the smooth concave surface 58 to the enlarged mounting portion 46, so that stress concentration occurring at the rod-shaped body 44 and the connecting portion 48 during boring can be suppressed. As a result, breakage of the tool 42 can be prevented to extend the life of the tool 42.

Figure 14:
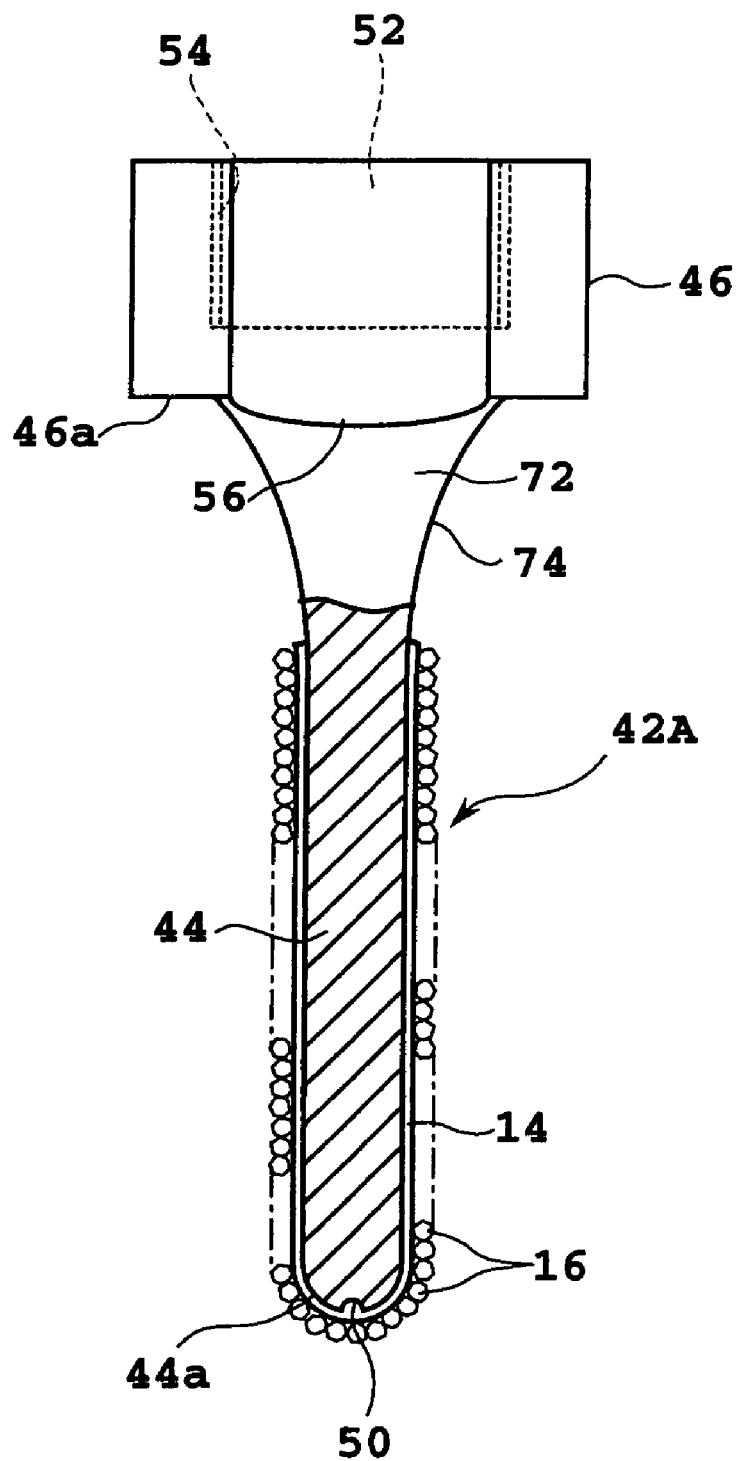
FIG. 14 is a partially sectional, elevational view of a metal bonded drilling and boring tool according to a modification of the fifth preferred embodiment.

Referring to FIG. 14, there is shown a metal bonded drilling and boring tool 42A according to a modification of the fifth preferred embodiment shown in FIG. 12. The tool 42A is different in shape of a connecting portion 72 from the tool 42 according to the fifth preferred embodiment, and the other configuration is the same as that of the tool 42. The connecting portion 72 has a concave surface 74 continuing to the outer circumferential surface of the rod-shaped body 44 and connected to a bottom surface 46a of the enlarged mounting portion 46. The concave surface 74 has a radius of curvature of 1 mm or more, preferably 25 to 80 mm.

Also in the tool 42A, the rod-shaped body 44 is connected through the connecting portion 72 having the smooth concave surface 74 to the enlarged mounting portion 46, so that stress concentration occurring at the rod-shaped body 44 and the connecting portion 72 during boring can be prevented to thereby extend the life of the tool 42A.

Figure 15:
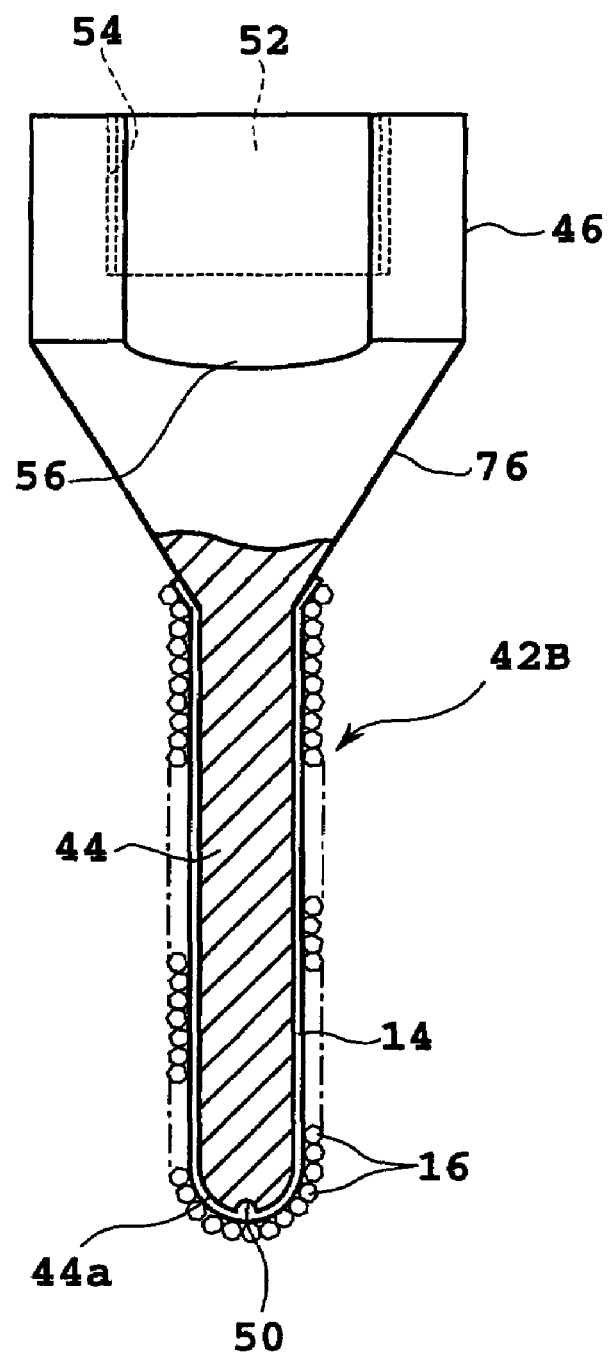
FIG. 15 is a partially sectional, elevational view of a metal bonded drilling and boring tool according to another modification of the fifth preferred embodiment.

Referring to FIG. 15, there is shown a metal bonded drilling and boring tool 42B according to another modification of the fifth preferred embodiment shown in FIG. 12. The tool 42B is different from the tool 42 in that the rod-shaped body 44 is connected through a frustoconical connecting portion 76 to the enlarged mounting portion 46. The other configuration is the same as that of the tool 42. The frustoconical connecting portion 76 has a conical surface connected to the outer circumferential surface of the rod-shaped body 44 and the outer circumferential surface of the enlarged mounting portion 46.

Also in the tool 42B, the rod-shaped body 44 is connected through the frustoconical connecting portion 76 to the enlarged mounting portion 46, so that stress concentration occurring at the rod-shaped body 44 and the connecting portion 76 during boring can be suppressed to thereby extend the life of the tool 42B. The conical surface of the frustoconical connecting portion 76 has an inclination angle set preferably in the range of 10 to 45 degrees.

Figure 16:
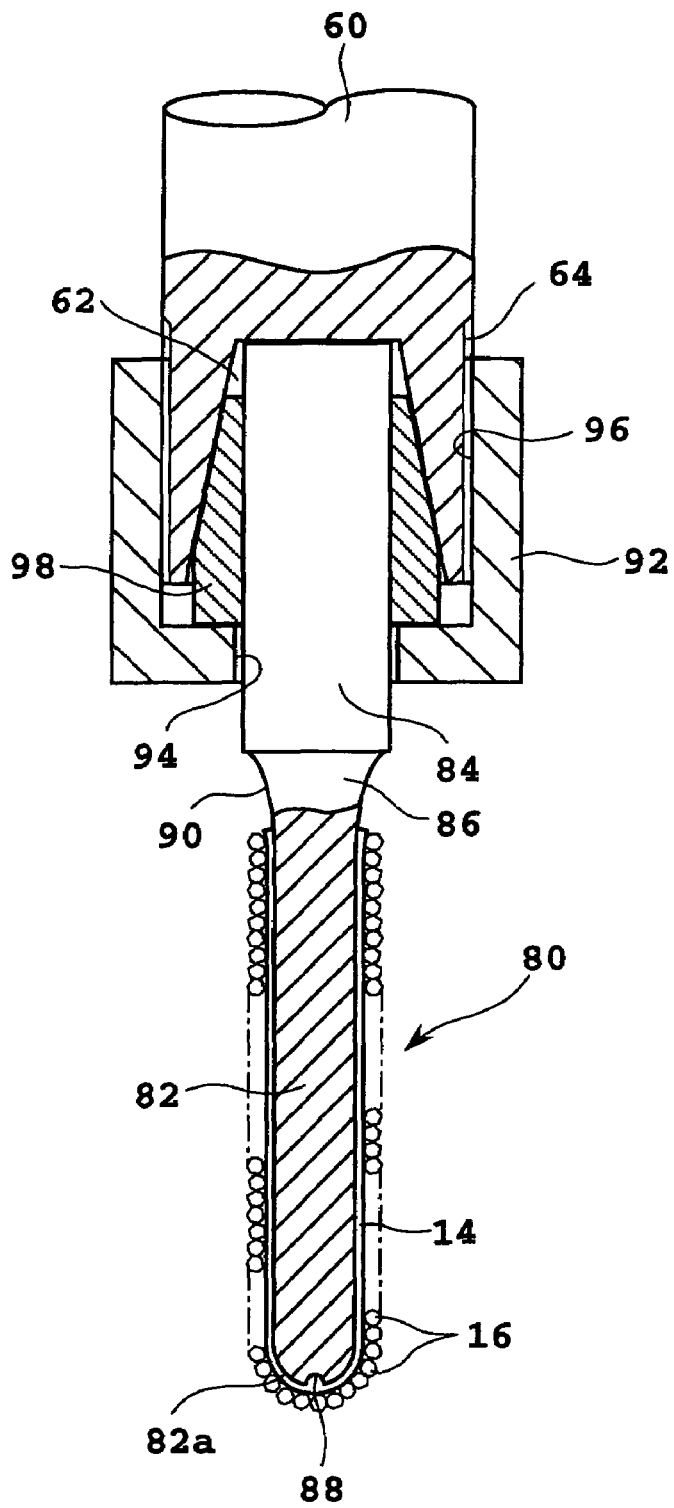
FIG. 16 is a partially sectional, elevational view of a metal bonded drilling and boring tool according to a sixth preferred embodiment of the present invention in the condition where the tool is mounted on a spindle.

Referring to FIG. 16, there is shown a metal bonded drilling and boring tool 80 according to a sixth preferred embodiment of the present invention in the condition where the tool 80 is mounted on a front end portion of the spindle 60. The tool 80 includes a rod-shaped body 82, a rod-shaped enlarged mounting portion 84 larger in diameter than the rod-shaped body 82, and a connecting portion 86 connecting the rod-shaped body 82 and the enlarged mounting portion 84. For example, the rod-shaped body 82 has a diameter of 3 mm, and the enlarged mounting portion 84 has a diameter of 6 mm. The connecting portion 86 has a concave surface 90 continuing to the outer circumferential surface of the rod-shaped body 82 and connected to the outer circumferential surface of the enlarged mounting portion 84. The concave surface 90 has a radius of curvature of 1 mm or more, preferably 5 to 30 mm.

The rod-shaped body 82 has a semispherical front end portion 82a. The semispherical front end portion 82a is formed with a depression (dimple) 88 at the center and in the vicinity thereof. Although not especially shown, the semispherical front end portion 82a is formed with a groove for chip ejection as similar to the groove 18 shown in FIG. 4A. Further, at least one escape portion like the escape portion 20 shown in FIG. 4A is formed on the outer circumferential surface of the rod-shaped body 82. Numerous diamond abrasive grains 16 are bonded by a metal bond member 14 to the outer circumferential surface of the rod-shaped body 82 over the entire length thereof and of a part of the connecting portion 86 continuing to the rod-shaped body 82.

A collet chuck 98 and a nut 92 are used to mount the tool 80 to the spindle 60. The nut 92 has a hole 94 for insertion of the enlarged mounting portion 84 of the tool 80. An internal screw thread 96 is formed on the inner circumferential surface of the nut 92 to engage with the external screw thread 64 of the spindle 60. In mounting the tool 80 to the spindle 60, the collet chuck 98 is inserted into the recess 62 of the spindle 60, and the nut 92 is next loosely engaged with the threaded front end portion of the spindle 60. Thereafter, the enlarged mounting portion 84 of the tool 80 is inserted through the hole 94 of the nut 92 into the collet chuck 98 until the front end of the enlarged mounting portion 84 comes into abutment against the bottom surface of the recess 62. Thereafter, the nut 92 is tightened to the threaded front end portion of the spindle 60. Accordingly, the collet chuck 98 is pressed on the enlarged mounting portion 84 to thereby firmly fix the tool 80 to the spindle 60.

Also in the tool 80, the rod-shaped body 82 is connected through the connecting portion 86 having the smooth concave surface 90 to the enlarged mounting portion 84, so that stress concentration occurring at the rod-shaped body 82 and the connecting portion 86 during boring can be suppressed to thereby prevent breakage of the tool 80, thus extending the life of the tool 80.

Figure 17:
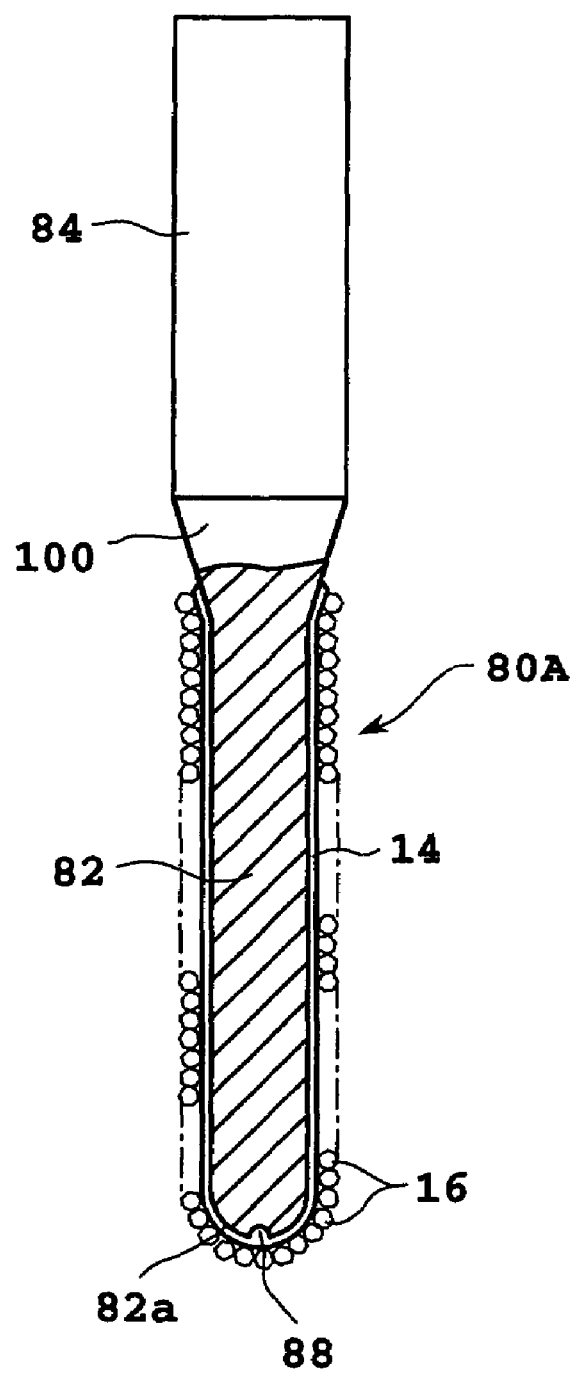
FIG. 17 is a partially sectional, elevational view of a metal bonded drilling and boring tool according to a modification of the sixth preferred embodiment.

Referring to FIG. 17, there is shown a metal bonded drilling and boring tool 80A according to a modification of the sixth preferred embodiment shown in FIG. 16. The tool 80A is different from the tool 80 shown in FIG. 16 in that the rod-shaped body 82 is connected through a frustoconical connecting portion 100 to the enlarged mounting portion 84. The other configuration is the same as that of the tool 80. The conical surface of the frustoconical connecting portion 100 has an inclination angle set preferably in the range of 10 to 45 degrees. Also in the tool 80A, stress concentration occurring at the rod-shaped body 82 and the connecting portion 100 during boring can be suppressed to thereby extend the life of the tool 80A.

According to the metal bonded drilling and boring tool of the present invention, the abrasive grains are chemically strongly fixed to the metal bond member. Accordingly, the separation of the abrasive grains from the metal bond member during drilling and boring can be prevented, and a stable drilling and boring performance can be maintained for a long period of time. Further, the drilling operation and the boring operation can be continuously performed to a hard material such as a stone or concrete by using the tool of the present invention without the need for tool exchange. Further, the tool is also usable for peripheral trimming, deburring, etc.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A metal bonded drilling and boring tool comprising:
   a rod-shaped body having a substantially semispherical front end portion at a center thereof and a first diameter said rod-shaped body being solid in cross-section;
   an enlarged mounting portion having a second diameter larger than said first diameter, said enlarged mounting portion having a mounting hole with an internal screw thread;
   a connecting portion connecting said rod-shaped body and said enlarged mounting portion; and
   numerous abrasive grains brazed by a brazing member to an outer circumferential surface of said rod-shaped body at said front end portion and extending a given length from said front end portion to include a part of said connecting portion,
   wherein said rod-shaped body has an arcuate depression formed on said front end portion at the center and in the vicinity thereof, wherein said arcuate depression defines an arc extending into the rod-shaped body in an axial direction with endpoints along a circumferential interface between said depression and said front end portion surrounding said depression.

2. A metal bonded drilling and boring tool according to claim 1, wherein said connecting portion has a concave surface continuing to the outer circumferential surface of said rod-shaped body.

3. A metal bonded drilling and boring tool according to claim 1, wherein said connecting portion has a frustoconical shape.

4. A metal bonded drilling and boring tool according to claim 1, further comprising an elastic member bonded to a bottom surface of said mounting hole.

5. A metal bonded drilling and boring tool comprising:
   a rod-shaped body having a substantially semispherical front end portion and a first diameter;
   an enlarged mounting portion having a second diameter larger than said first diameter, said enlarged mounting portion having a mounting hole with an internal screw thread;

a connecting portion connecting said rod-shaped body and said enlarged mounting portion; and numerous abrasive grains brazed to an outer circumferential surface of said rod-shaped body at said front end portion and at a portion having a given length from said front end portion by a brazing member;

said brazing member comprises a bond member formed primarily of copper alloy;

said bond member containing a material selected from the group consisting of Ti, Al, and a mixture thereof;

an average abrasive grain projection height being set to 30% or more of an average abrasive grain diameter, where said abrasive grain projection height is defined as a distance between the surface of a deepest portion of said bond member present between any two adjacent ones of said abrasive grains and the top of each of said two adjacent abrasive grains; and an average abrasive grain spacing being set to 200% or more of said average abrasive grain diameter, where said abrasive grain spacing is defined as a distance between the tops of said two adjacent abrasive grains.

6. A metal bonded drilling and boring tool according to claim 5, wherein said rod-shaped body has at least one escape portion formed on said portion having said given length.

7. A metal bonded drilling and boring tool according to claim 5, wherein said rod-shaped body has at least one groove formed on said front end portion.

8. A metal bonded drilling and boring tool comprising:

a rod-shaped body having a substantially semispherical front end portion at a center thereof, and a first diameter said rod-shaped body being solid in cross-section;

an enlarged mounting portion having a second diameter larger than said first diameter;

a connecting portion connecting said rod-shaped body and said enlarged mounting portion; and numerous abrasive grains brazed by a brazing member to an outer circumferential surface of said rod-shaped body at said front end portion and extending a given length from said front end portion to include a part of said connecting portion, wherein said rod-shaped body has an arcuate depression formed on said front end portion at the center and in the vicinity thereof, wherein said arcuate depression defines an arc extending into the rod-shaped body in an axial direction with endpoints along a circumferential interface between said depression and said front end portion surrounding said depression.

9. A metal bonded drilling and boring tool according to claim 8, wherein said connecting portion has a concave surface continuing to the outer circumferential surface of said rod-shaped body.

10. A metal bonded drilling and boring tool according to claim 8, wherein said connecting portion has a frustoconical shape.

11. A metal bonded drilling and boring tool according to claim 8, wherein the depression seatably holds the abrasive grains.

12. A metal bonded drilling and boring tool comprising:

a rod-shaped body having a substantially semispherical front end portion and a first diameter;

an enlarged mounting portion having a second diameter larger than said first diameter;

a connecting portion connecting said rod-shaped body and said enlarged mounting portion; and numerous abrasive grains brazed to an outer circumferential surface of said rod-shaped body at said front end portion and at a portion having a given length from said front end portion by a brazing member;

said brazing member comprises a bond member formed primarily of copper alloy;

said bond member containing a material selected from the group consisting of Ti, Al, and a mixture thereof;

an average abrasive grain projection height being set to 30% or more of an average abrasive grain diameter, where said abrasive grain projection height is defined as a distance between the surface of a deepest portion of said bond member present between any two adjacent ones of said abrasive grains and the top of each of said two adjacent abrasive grains; and an average abrasive grain spacing being set to 200% or more of said average abrasive grain diameter, where said abrasive grain spacing is defined as a distance between the tops of said two adjacent abrasive grains.

13. A metal bonded drilling and boring tool according to claim 12, wherein said rod-shaped body has at least one escape portion formed on said portion having said given length.

14. A metal bonded drilling and boring tool according to claim 12, wherein said rod-shaped body has at least one groove formed on said front end portion.

15. A metal bonded drilling and boring tool according to claim 1, wherein the depression seatably holds the abrasive grains.

* * * * *